us008354489B2

United States Patent
Weinmann et al.

(10) Patent No.: US 8,354,489 B2
(45) Date of Patent: Jan. 15, 2013

(54) SILICON-BORON-CARBON-NITROGEN CERAMICS AND PRECURSOR COMPOUNDS, METHODS FOR THE SALT-FREE POLYMERISATION OF RNHAL3-NSI-X-BRMHAL2-M

(75) Inventors: Markus Weinmann, Stuttgart (DE); Martin Jansen, Leonberg (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 204 days.

(21) Appl. No.: 12/936,600

(22) PCT Filed: Apr. 7, 2009

(86) PCT No.: PCT/EP2009/002569
§ 371 (c)(1),
(2), (4) Date: Oct. 6, 2010

(87) PCT Pub. No.: WO2009/124725
PCT Pub. Date: Oct. 15, 2009

(65) Prior Publication Data
US 2011/0028302 A1    Feb. 3, 2011

(30) Foreign Application Priority Data
Apr. 9, 2008  (DE) .......................... 10 2008 018 062

(51) Int. Cl.
*C08G 77/06*  (2006.01)
(52) U.S. Cl. .................................. 528/5; 528/30; 528/38
(58) Field of Classification Search ................ 528/5, 30, 528/38
See application file for complete search history.

(56) References Cited

U.S. PATENT DOCUMENTS

2007/0155611 A9 * 7/2007 Jansen et al. .................... 501/88
2009/0274605 A1 * 11/2009 Jansen et al. .................. 423/284

FOREIGN PATENT DOCUMENTS

DE    10 2004 059942 A1   6/2006
EP         1 317 462 B     6/2005

* cited by examiner

*Primary Examiner* — Margaret Moore
(74) *Attorney, Agent, or Firm* — Rothwell, Figg, Ernst & Manbeck, P.C.

(57) ABSTRACT

The present invention relates to novel methods for the salt-free polymerization of borosilylamines, which comprise the structural feature Si—N—B and borosilyl hydrocarbons, which comprise the structural feature Si—X—B, wherein X may be a methylene group or a hydrocarbon chain $C_xH_y$ or a cyclic hydrocarbon unit, by reaction thereof with disilazanes $R_3Si$—$NR$—$SiR_3$.

9 Claims, No Drawings

SILICON-BORON-CARBON-NITROGEN CERAMICS AND PRECURSOR COMPOUNDS, METHODS FOR THE SALT-FREE POLYMERISATION OF RNHAL3-NSI-X-BRMHAL2-M

CROSS REFERENCE TO RELATED APPLICATION

This application is a 35 U.S.C. 371 National Phase Entry Application from PCT/EP2009/002569, filed Apr. 7, 2009, which claims the benefit of German Patent Application No. 10 2008 018 062.9 filed on Apr. 9, 2008, the disclosure of which is incorporated herein in its entirety by reference.

DESCRIPTION

The present invention relates to novel methods for the salt-free polymerisation of borosilylamines, which comprise the structural feature Si—N—B and borosilyl hydrocarbons, which comprise the structural feature Si—X—B, wherein X may be a methylene group or a hydrocarbon chain $C_xH_y$, or a cyclic hydrocarbon unit, by reaction thereof with disilazanes $R_3Si$—NR—$SiR_3$.

According to DE 41 07 108 and DE 100 45 428 the synthesis of polymeric precursors for Si/B/C/N ceramics proceeds by crosslinking the one-component precursor TADB ($Cl_3Si$—NH—$BCl_2$) or DMTA ($Cl_3Si$—NMe-$BCl_2$) with ammonia or primary amines in an inert solvent. All the chlorine atoms are here firstly replaced with amino or alkylamino groups. The preliminarily obtained products crosslink in subsequent condensation reactions to yield polymers. On replacement of the chlorine atoms by the amino or alkylamino groups, hydrogen chloride is released which, under the stated conditions, forms ammonium chloride or amine hydrochlorides with the nitrogen compound introduced in excess. These hydrochlorides precipitate out of the reaction solution as solids and must be filtered out of the reaction solution in time-consuming manner before further processing.

The object of the present invention is the solvent-free crosslinking of the one-component precursor with disilazanes $R_3Si$—NR—$SiR_3$ (R=H, alkyl, aryl, alkenyl) without the formation of solid co-products. By selection of stoichiometry and reaction conditions, in particular the parameters pressure, temperature and time, the intention is to optimise and purposefully adjust the rheological properties of the polymers with regard to their melt spinning behaviour, their use as layered materials or their application in solid or fibre composite materials.

Another object of the present invention is a synthesis of the oligomers or polymers without isolating and/or working up the monomeric precursors or intermediates, but instead by directly subjecting the mixtures to crosslinking without working up. To this end, a chlorosilane and a disilazane introduced in excess are firstly reacted and the resultant mixture of chlorodisilazane and excess disilazane is then reacted with a haloborane, preferably $BCl_3$.

A further object of the present invention is the conversion of the oligomeric or polymeric compounds into ceramic materials. Said conversion may be carried out either in an inert atmosphere (noble gases or nitrogen) or also in a reactive atmosphere, wherein thermolysis may be performed in a temperature range from 25 to 2300° C., preferably up to 1800° C.

The objects underlying the invention were achieved by a method for producing silicon-boron-carbon-nitrogen polymers comprising the reaction of disilazanes of the formula (I) $R_3Si$—NR—$SiR_3$, wherein R in each case mutually independently represents hydrogen or a hydrocarbon residue with 1 to 20 C atoms, with a borosilylamine of the formula (II)

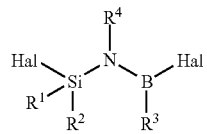

in which
Hal in each case independently means Cl, Br or I,
$R^1$, $R^2$, $R^3$ and $R^4$ in each case mutually independently represent hydrogen, Hal or a hydrocarbon residue with 1 to 20 C atoms, or with a borosilyl hydrocarbon of the formula (III)

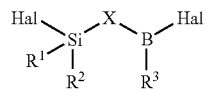

in which
Hal in each case independently means Cl, Br or I,
$R^1$, $R^2$ in each case independently represent H, Hal or a hydrocarbon residue with 1 to 20 C atoms, and
X in each case independently represents a linear, unbranched, branched or cyclic hydrocarbon residue with 1 to 20 C atoms,
or
with a chlorosilane of the formula (IV) $R_1R_2SiHal_2$, in which
Hal in each case independently means Cl, Br or I, and
$R^1$ and $R^2$ in each case independently represent H or a hydrocarbon residue with 1 to 20 C atoms and with a chloroborane of the formula (V) $RBCl_2$, in which
R represents hydrogen, Hal or a hydrocarbon residue with 1 to 20 C atoms.

The reaction carried out according to the invention proceeds without forming solid secondary products which, in the methods known in the prior art, then have to be separated in a troublesome manner. The reaction is thus in particular salt-free. The method according to the invention may furthermore be carried out without solvent. The possibility of producing polyborocarbosilazanes without solvent and without the formation of solid secondary products enables a synthesis in which monomeric precursors or intermediates do not have to be isolated or worked up, for example purified. Instead, the reaction mixture may be subjected directly to crosslinking or calcination without working up.

Using the method according to the invention, it is possible to obtain polyborocarbosilazanes which are silicon-boron-carbon-nitrogen compounds. According to the invention, the term polyborocarbosilazane here includes both oligo- and polyborocarbosilazanes and in particular includes compounds with a size of 250 to 100000, preferably of 1000 to 10000 Da or of a chain length of 3 to 1000, in particular 10 to 500 and preferably of 20 to 100.

A disilazane of the formula (I) $R_3Si$—N—R—$SiR_3$ is used in the method according to the invention, wherein R in each case independently represents hydrogen or a hydrocarbon residue with 1 to 20 C atoms, in particular 1 to 10 C atoms. The hydrocarbon residue may for example be an alkyl, alkenyl or aryl residue. The hydrocarbon residue may be unbranched or branched. It may furthermore be a linear or cyclic residue.

The R in the disilazane preferably comprises a $C_1$-$C_6$ alkyl residue, in particular methyl. The disilazane used is particularly preferably hexamethyldisilazane or heptamethyldisilazane.

In one embodiment of the invention, the reaction proceeds with a borosilylamine of the formula (II)

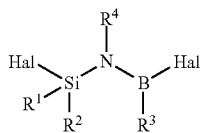

in which Hal in each case independently means Cl, Br or I, preferably Cl,
$R^1$, $R^2$, $R^3$ and $R^4$ in each case independently represent H, Hal or a hydrocarbon residue with 1 to 20 C atoms, in particular with 1 to 10 C atoms. The residues $R^1$, $R^2$, $R^3$ and $R^4$ may for example represent an alkyl, an alkenyl or an aryl group. If they represent a hydrocarbon residue, the latter may be unbranched or branched, linear or cyclic. The residues $R^1$, $R^2$, $R^3$ and $R^4$ are preferably a $C_1$-$C_6$ alkyl residue or a halogen, in particular Cl. Particularly preferably used borosilylamines are trichlorosilylaminodichloroborane (TADB), $Cl_3Si$—NH—$BCl_2$ and dichloroborylmethyltrichlorosilylamine (DMTA), $Cl_3Si$—NMe-$BCl_2$.

In a further preferred embodiment, the reaction proceeds with a borosilyl hydrocarbon of the formula (III),

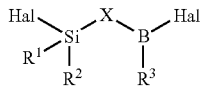

in which
Hal in each case independently means Cl, Br or I, in particular Cl,
$R^1$, $R^2$ and $R^3$ in each case independently represent H, Hal or a hydrocarbon residue with 1 to 20 C atoms, in particular 1 to 10 C atoms, and
X represents a hydrocarbon group with 1 to 20 C atoms.

If $R^1$, $R^2$ and $R^3$ denote a hydrocarbon residue, the latter may be unbranched or branched, linear or cyclic and for example represent an alkyl, alkenyl or aryl group. X is a bridging unit and preferably represents a methylene group, a hydrocarbon chain $C_xH_y$, in which x=2 to 20, in particular 2 to 10, and y=0 to 40, in particular 2 to 20 or a cyclic hydrocarbon unit, for example a $C_6H_4$ grouping. X particularly preferably represents $CH_2$, $CHCH_3$, $CH_2CH_2$, $CH=CH$, $C\equiv C$, $CHCH_2CH_3$, $CHCH=CH_2$ or $C_6H_4$.

In a further preferred embodiment, a chlorosilane $R^1R^2SiHal$ is firstly reacted with a disilazane $R^3Si$—NR—$SiR^3$ and the resultant mixture of chlorodisilazane and excess silazane is subsequently reacted with a chloroborane $RBCl_2$, preferably with $BCl_3$. In the chlorosilane, the residues $R^1$ and $R^2$ in each case independently denote hydrogen, Hal, in particular Cl, or a $C_1$ to $C_{20}$, in particular a $C_1$ to $C_{10}$ hydrocarbon residue, in particular an aryl, alkyl, alkenyl or alkynyl residue. In the disilazane, the residues have the above-stated meanings. In the chloroborane, R denotes H, Hal or a $C_1$ to $C_{20}$, in particular a $C_1$ to $C_{10}$ hydrocarbon residue. In order to take the reaction to completion, the product is preferably progressively heated to 80 to 250° C., for example under a vacuum or at standard pressure, so removing the volatile constituents by distillation.

The invention in particular relates to reactions of compounds $R_nHal_{3-n}Si$—NR—$BR_mHal_{2-m}$ or $R_nHal_{3-n}Si$—X—$BR_mHal_{2-m}$ or mixtures thereof, with disilazanes $R_3Si$—NR—$SiR_3$ or mixtures thereof, wherein Hal in each case independently means Cl, Br or I, R in each case independently represents a hydrocarbon residue with 1 to 20 C atoms or hydrogen, X may be a methylene group or a hydrocarbon chain $C_xH_y$ or a cyclic hydrocarbon unit, n assumes values of 0 to 2 and m values of 0 or 1.

In the reaction according to the invention, the disilazane of the formula (I) is preferably introduced at least in stoichiometric quantity or in excess and in particular reacted at least in stoichiometric quantity or in excess with the borosilylamines of the formula (II) and/or the borosilyl hydrocarbons of the formula (III). A stoichiometric quantity here means half an equivalent of disilazane per Hal atom, in particular per Cl atom.

According to the invention, it is possible in each case to use one or more compounds the above-stated formulae and in particular also mixtures of disilazanes, mixtures of borosilylamines, mixtures of borosilyl hydrocarbons, mixtures of chlorosilanes or mixtures of chloroboranes. It is, however, also possible in each case to use only one individual compound of the above-stated formulae.

It has surprisingly been found that various chemical, physico-chemical and material properties of the polymers may simply and purposefully be influenced by the conditions applied during the reaction, such as temperature, time, pressure and the selection the substituents R and X or the number of silicon- or boron-bound halogen atoms and the selected stoichiometry. It has moreover been found the composition and properties of the ceramics obtained from the polymers by thermolysis may also purposefully be controlled by selection of the reaction conditions and reactants.

The method according to the invention is in particular carried out at a temperature of −70° C. to 200° C., preferably of −10° C. to 150° C. Using relatively high temperatures in particular yields polymers which are distinguished by a relatively high level of crosslinking and therefore tend to be of higher viscosity and to occur in part in solid form. In contrast, when low temperatures, in particular temperatures of <50° C., are used, liquid to low-viscosity oligomers or polymers are obtained.

The reaction is preferably carried out for a duration of 30 min to 72 h, in particular for 2 to 8 h. The reaction is preferably performed at standard pressure, while the products are worked up at standard pressure or reduced pressure, preferably at $10^{-3}$ to 1013 mbar.

The method according to the invention yields novel oligo- or polyborocarbosilazanes, which are accordingly likewise provided by the invention. The novel oligo- or polyborocarbosilazanes differ from hitherto known compounds by their simple processing and the fact that the rheological properties of importance for subsequent use may purposefully be adjusted by the temperatures and pressures applied during working up.

The present invention also provides the conversion of the resultant oligomeric or polymeric compounds into ceramic materials. To this end, the oligo- or polycarbosilazanes are pyrolysed at temperatures of between −200° C. and 2000° C. Pyrolysis in particular proceeds in an ammonia or inert gas atmosphere. An inert gas atmosphere preferably consists of noble gases and/or nitrogen. Pyrolysis preferably proceeds at temperatures of between −100° C. and 1800° C., more preferably between 25° C. and 1700° C. After pyrolysis, a calcination step is preferably carried out, preferably at a temperature of between 800° C. and 2000° C., more preferably between 900° C. and 1800° C., wherein the calcination step preferably also proceeds in an ammonia or inert gas atmosphere.

The oligo- or polyborocarbosilazanes according to the invention are in particular ideally suitable for the production of polymers or ceramic powders, coatings, fibres, mouldings, fibre composite materials or films.

EXEMPLARY EMBODIMENTS

Example 1

31.4 g (195 mmol) of hexamethyldisilazane, $Me_3Si$—NH—$SiMe_3$, are initially introduced and 15.0 g (65 mmol) of trichlorosilylaminodichloroborane (TADB), $Cl_3Si$—NH—$BCl_2$ are added dropwise at −10° C. with vigorous stirring. Once addition is complete, the mixture is heated initially to room temperature and then to 50° C. for 3 h. $Me_3SiCl$ formed during the reaction is removed by slow application of a vacuum (approx. 200 mbar), before the temperature is raised, at this pressure, initially to 80° C. for 3 h, then to 120° C. for 2 h and to 150° C. for 2 h. Finally, the pressure is lowered to 10 mbar at 150° C.

The residue is a colourless, hard polymer powder which decomposes at above 200° C. Thermolysis at 1400° C. (argon) gives rise to an X-ray amorphous Si/C/B/N ceramic at a yield of 57%.

Example 2

13.67 g (55.8 mmol) of dichloroborylmethyltrichlorosilaneamine (DMTA), $Cl_3Si$—NMe-$BCl_2$ are initially introduced at 0° C. and combined all at once with vigorous stirring with 25.2 g (156 mmol) of hexamethyldisilazane, $Me_3Si$—NH—$SiMe_3$. The mixture is heated initially to room temperature and then to 50° C. for 3 h. $Me_3SiCl$ formed during the reaction is removed by slowly applying a vacuum (approx. 200 mbar), before the temperature is raised, at this pressure, initially to 80° C. for 3 h. Finally, the pressure is lowered to 5 mbar at this temperature. The polymer remains as a colourless, high-viscosity gel which, after freeze drying, can be isolated as a colourless powder.

Example 3

4 g (19 mmol) of dichloroborylmethyltrichlorosilaneamine (DMTA), $Cl_3Si$—NMe-$BCl_2$, are initially introduced at 0° C. and combined all at once with vigorous stirring with 12.9 g (80 mmol) of hexamethyldisilazane, $Me_3Si$—NH—$SiMe_3$. The mixture is heated initially to room temperature and then to 50° C. for 3 h. $Me_3SiCl$ formed during the reaction is removed by slowly increasing the temperature initially to 50° C., then to 70° C. and finally to 100° C. The temperature is progressively further raised to 160° C., wherein hexamethyldisilazane present in excess and/or released by condensation is removed by distillation. The residue is a high-viscosity polymer from which fibres may be obtained by a melt spinning process at 90° C. Thermolysis at 1400° C. under an argon atmosphere gives rise to an amorphous Si/C/B/N ceramic at a yield of 41%.

Example 4

35.11 g (235 mmol) of methyltrichlorosilane, $CH_3SiCl_3$ are combined at 0° C. with 126 g (780 mmol) of hexamethyldisilazane. Once addition is complete, the mixture is heated to 25° C., stirred for one hour and then cooled to −70° C. 27.6 g (235 mmol) of $BCl_3$ are slowly incorporated by condensation; once addition is complete, the reaction solution is heated to 25° C. and stirred overnight. The volatile constituents are removed by distillation by progressively raising the temperature to 50° C., 90° C., 120° C. and 150° C. (for three hours in each case). The residue is a high-viscosity polymer from which green fibres may be obtained in a melt spinning process at 85° C.-95° C. Thermolysis at 1400° C. under an argon atmosphere gives rise to an Si/C/B/N ceramic at a yield of 51%.

Example 5

29.0 g (165 mmol) of heptamethyldisilazane, $Me_3Si$—NMe-$SiMe_3$, are initially introduced and 15.0 g (55 mmol) of trichlorosilyldichloroborylethane (TSDE), $Cl_3Si$—$CHCH_3$—$BCl_2$, are added dropwise at 0° C. with vigorous stirring. Once addition is complete, the mixture is heated to 50° C. within four hours. The $Me_3SiCl$ formed during the reaction is removed by slowly applying a vacuum (approx. 200 mbar), before the temperature is raised, at this pressure, initially to 80° C. Finally, the pressure is lowered to $10^{-1}$ mbar. The residue is a colourless, viscous polymer gel which, on thermolysis (1400° C., argon), gives rise to an X-ray amorphous Si/C/B/N ceramic at a yield of 61%.

The invention claimed is:

1. A method for the production of silicon-boron-carbon-nitrogen polymers comprising reacting disilazanes of formula (I) $R_3Si$—NR—$SiR_3$, wherein R in each case mutually independently represents hydrogen or a hydrocarbon residue with 1 to 20 C atoms with a borosilylamine of formula (II):

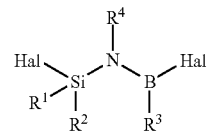

in which

Hal in each case independently means Cl, Br or I, $R^1$, $R^2$, $R^3$ and $R^4$ in each case mutually independently represent hydrogen, Hal or a hydrocarbon residue with 1 to 20 C atoms or with a borosilyl hydrocarbon of formula (III):

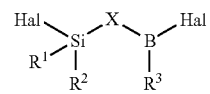

in which

Hal in each case independently means Cl, Br or I, $R^1$, $R^2$ and $R^3$ in each case independently represent H, Hal or a hydrocarbon residue with 1 to 20 C atoms and X in each case independently represents a linear, unbranched, branched or cyclic hydrocarbon residue with 1 to 20 C atoms.

2. A method according to claim 1, wherein each instance of Hal denotes Cl.

3. A method according to claim 1, wherein the polymers are produced without isolating and/or working up monomeric intermediates.

4. A method according to claim 1, wherein the disilazane of formula (I) is introduced in stoichiometric quantity or in excess.

5. A method according to claim 1, wherein mixtures of disilazanes and/or mixtures of borosilylamines and/or mixtures of borosilyl hydrocarbons are used.

6. A method according to claim 1, comprising heating to 80 to 250° C.

7. A polyborocarbosilazane obtained by the method according to claim 1.

8. A method for the production of a silicon carbonitride ceramic, wherein a polyborocarbosilazane according to claim 7 is pyrolyzed at a temperature of between −200° C. and 2000° C.

9. A method according to claim 8, further comprising calcinating at a temperature of between 800° C. and 2000° C.

* * * * *